No. 662,064. Patented Nov. 20, 1900.
F. EHMKE.
TAP AND DIE.
(Application filed Jan. 4, 1900.)
(No Model.)

Witnesses
Caleb J. Bieber.
D. M. Stewart.

Ferdinand Ehmke Inventor
by J. H. Stewart Attorney

THE NORRIS PETERS CO., PHOTO-LITHO., WASHINGTON, D. C.

UNITED STATES PATENT OFFICE.

FERDINAND EHMKE, OF READING, PENNSYLVANIA, ASSIGNOR OF ONE-HALF TO DANIEL K. BIEHL, OF SAME PLACE.

TAP AND DIE.

SPECIFICATION forming part of Letters Patent No. 662,064, dated November 20, 1900.

Application filed January 4, 1900. Serial No. 317. (No model.)

*To all whom it may concern:*

Be it known that I, FERDINAND EHMKE, a subject of the Emperor of Germany, and a resident of Reading, in the county of Berks and State of Pennsylvania, have invented certain new and useful Improvements in Taps and Dies, of which the following is a specification.

The object of my invention is to provide a tap or die which will be capable of cutting equally well either a right or left hand double thread. It is fully described in connection with the accompanying drawings, and the novel features are specifically pointed out in the claims.

Figure 2:
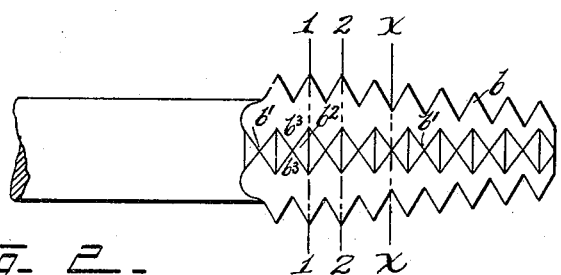
Figure 1:
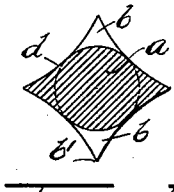
Figure 3:
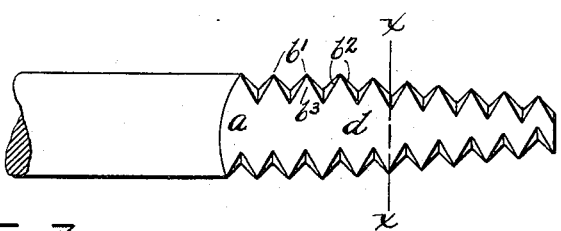
Figure 4:
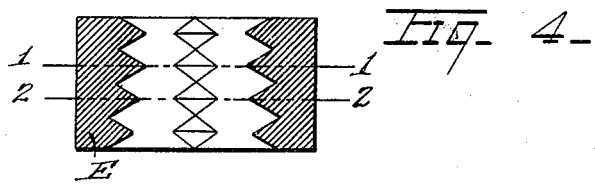

Figure 1 is a transverse section of a tap embodying my invention, taken on the line $x\ x$ of Fig. 2 or Fig. 3. Figs. 2 and 3 are elevations of the same from two different points of view. Fig. 4 is a sectional view of a corresponding die embodying my invention.

The general form of the tap or die may be as usual, my invention relating exclusively to the arrangement of the cutting-teeth. The form of these teeth $b$ is similar to that partially described in United States Patent No. 310,462, each tapering radially outward to an apex $b'$, toward which the longitudinal sides $b^3$ $b^3$ and the transverse sides $b^2$ $b^2$ converge, and the latter lying perpendicularly across the axis of the tap and being reduced in extent by the longitudinal concaving indicated at $d\ d$, so that they will not prevent the turning of the tap in either direction. In the drawings these cutting-teeth are arranged in four equally-spaced longitudinal rows, of which rows each diagonally opposite two form a pair having their teeth in line or lying in parallel planes 1 1 and 2 2 perpendicular to the axis of the tap. The other pair of teeth have their roots instead of their apices lying in these planes 1 1 and 2 2, as indicated in Fig. 2, so that their apices are in planes midway between said planes 1 1 and 2 2. This same arrangement of the cutting-teeth applies to die E, as indicated in Fig. 4.

In forming a tap with the cutting-teeth arranged as described, so as to effect the object of my invention, I cut each row of teeth separately, as in a milling-machine, properly setting the milling-tool for each row, instead of cutting a screw-thread as can be done with an ordinary tap.

In using my improved tap or die it is merely inserted in the drilled hole and turned right or left, as desired. The teeth in each pair of rows then cut a thread, thus jointly cutting a double thread at each turn of the tap.

What I claim is—

1. A tap or die for cutting either right or left hand double threads, having two diametrically opposite rows of pyramidal teeth for each thread, the side faces of which teeth are at right angles to an axial plane passing through their summits.

2. A tap or die for cutting either right or left hand double threads having four equally-spaced rows of pyramidal teeth, with the apices of the one pair of teeth in diametrically opposite rows and the bases of the teeth in the other rows arranged in the same planes which are perpendicular to the axis of the tap or die, the side faces of the teeth being at right angles to an axial plane passing through their summits.

Signed by me at Reading, Pennsylvania, this 28th day of December, 1899.

FERDINAND EHMKE.

Witnesses:
 W. G. STEWART,
 WOOD M. SCHWARTZ, Jr.